M. B. LLOYD.
COLLAPSIBLE GO-CART.
APPLICATION FILED NOV. 27, 1906.

968,170.

Patented Aug. 23, 1910.

2 SHEETS—SHEET 1.

WITNESSES
A. M. Walstrom
J. B. Eva

INVENTOR
MARSHALL B. LLOYD
BY Paul & Paul
HIS ATTORNEYS

THE NORRIS PETERS CO., WASHINGTON, D. C.

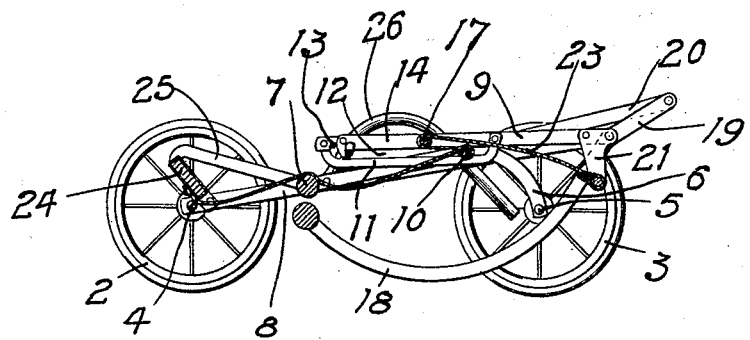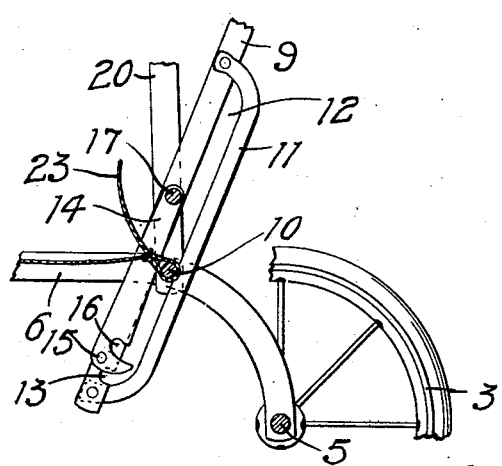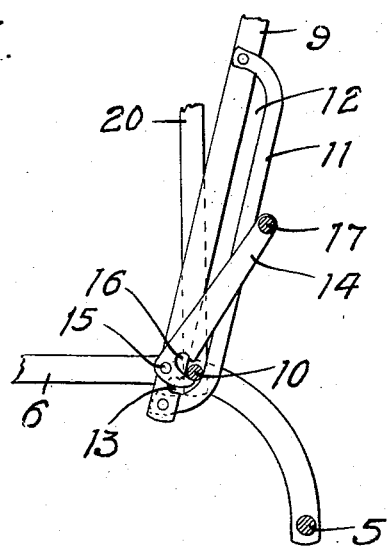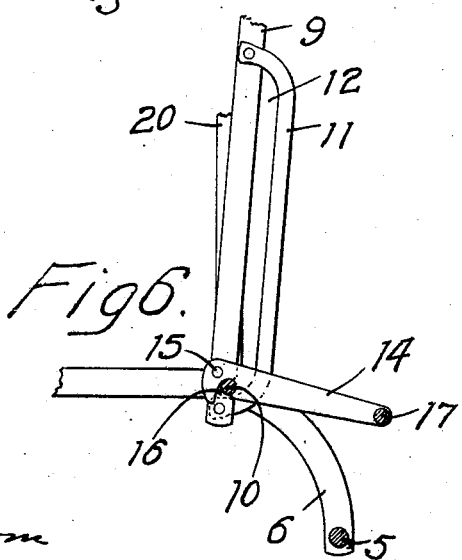

UNITED STATES PATENT OFFICE.

MARSHALL B. LLOYD, OF MINNEAPOLIS, MINNESOTA, ASSIGNOR TO LLOYD MANUFACTURING COMPANY, OF MINNEAPOLIS, MINNESOTA, A CORPORATION.

COLLAPSIBLE GO-CART.

968,170.  Specification of Letters Patent.  Patented Aug. 23, 1910.

Application filed November 27, 1906. Serial No. 345,308.

*To all whom it may concern:*

Be it known that I, MARSHALL B. LLOYD, of Minneapolis, Hennepin county, Minnesota, have invented certain new and useful Improvements in Collapsible Go-Carts, of which the following is a specification.

My invention relates to a child's collapsible go-cart, and the object of the invention is to provide a frame for the cart of substantial, durable construction though comparatively light and easily handled, and one that is capable of being easily and quickly collapsed or extended as desired.

A further object is to provide improved means for locking the frame in its extended or expanded position and positively preventing its premature collapse.

A further object is to provide a collapsible frame for a go-cart that is capable of being folded into a very compact form for convenience in shipping or storing the same.

The invention consists generally in various constructions and combinations, all as hereinafter described and particularly pointed out in the claims.

Figure 1:
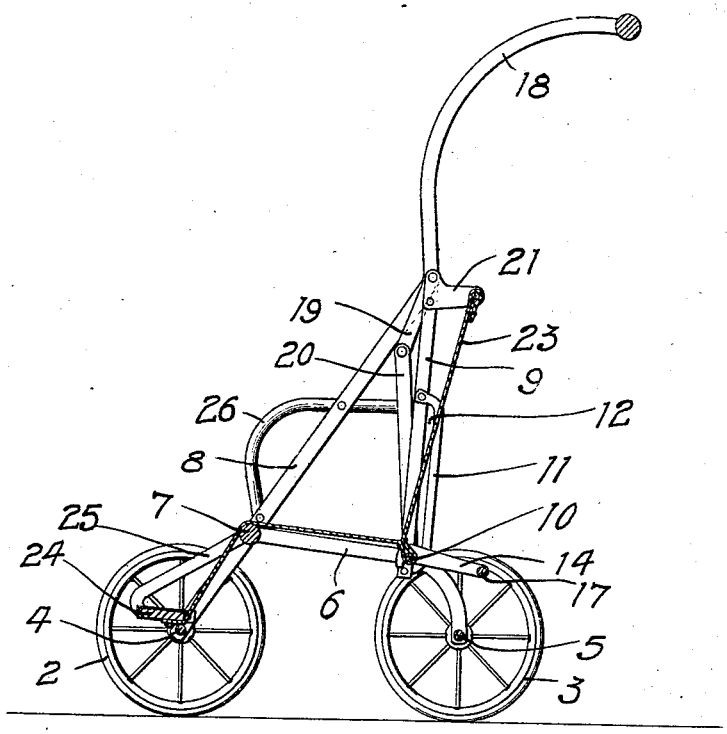
Figure 2:
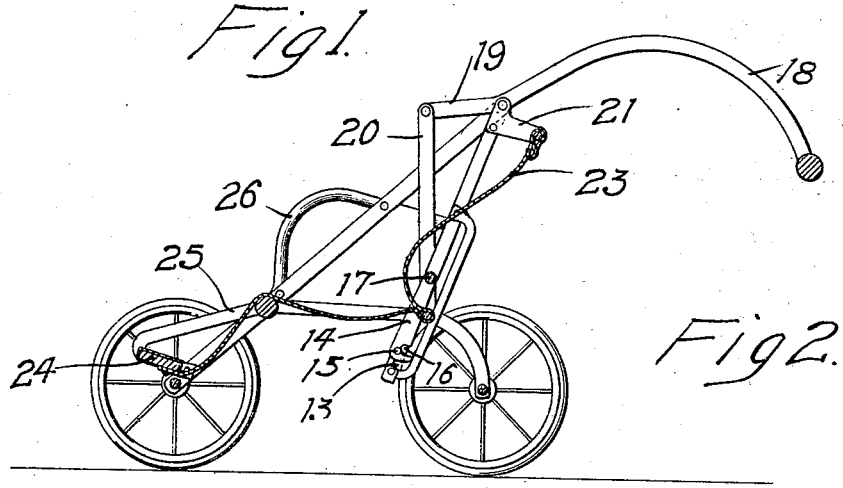

In the accompanying drawings, forming part of this specification, Figure 1 is a vertical sectional view of a go-cart embodying my invention, in its expanded position. Fig. 2 is a similar view showing the frame of the cart partially collapsed. Fig. 3 is a sectional view showing the frame entirely collapsed. Figs. 4, 5 and 6 are detail views illustrating the operation of expanding and locking the frame in its expanded position.

In the drawing, 2 and 3 represent the forward and rear carrying wheels of the cart mounted upon axles 4 and 5. 6 is a frame mounted at its rear end on the axle 5 and curved upwardly and forwardly therefrom and provided at its forward end with a cross bar or rod 7. This frame I will hereinafter refer to as the "wheeled frame" or the "cart frame" to distinguish it from the frame on which the seat is mounted. Bars 8 are pivoted on said rod and extend downwardly beyond the same to the forward axle 4 and the said bars project upwardly above the frame 6 and are pivotally connected at their upper ends to bars 9 which form the back of the frame of the cart. The bars 8 and 9 form that part of the cart which I prefer to designate as the seat frame, to distinguish it from the arched frame having the carrying wheels. A cross rod 10 is carried by the frame 6 and guiding straps 11 have their ends secured on each side of the cart to the bars 9 and form therewith a narrow guide 12 through which the cross rod 10 extends, and on which the bar 9 slides during the operation of folding or extending the frame. The lower ends of the bars 9 are provided with notches 13 to receive the rod 10 and plates 14 are pivoted at 15 on the said bars and adapted to swing thereon and have notches 16 which receive the cross rod 10 and lock it in the lower end of the guide when the frame is extended. The plates are connected by a rod 17 and the notches 16 are so arranged that when the plates are swung down to a horizontal position as indicated in Fig. 6, the cross rod will not only be locked firmly but the frame will be extended so that it will be rigid, and all lost motion in the joints taken up, and twisting or swaying of the frame when in use prevented. In other words, the downward swinging of the plates from a vertical to a horizontal position will exert a cam action on the cross rod 10 and cause it to be forced into the notches in the lower ends of the bars 9 and at the same time the final step in the expansion of the frame is performed. The plates will hang down over the rear axle where the rod connecting them may be easily struck by the foot of the person pushing the cart when it is desired to unlock and collapse the frame.

Handle bars 18 have a common pivot with the upper ends of the bars 8 and are provided with extensions 19 projecting beyond said pivots to which links 20 are pivotally attached connecting the said extensions with the cross bar 10. When the handle bars are raised to a vertical position the links 20 will be swung in toward the bars 9 and the said bars raised on the rod 10 to expand the frame to its position for using. When the handle bars are pressed downwardly the links 20 will be swung forward and the bars 9 will slide downwardly on the cross bar 10 as indicated in Fig. 2 until they assume a substantially horizontal position. Brackets 21 are provided on the upper ends of the bars 9 to which one end of a flexible filling or seat portion 23 for the frame is attached. This flexible seat is passed under the rod 10 and over the bar 7 and secured at its forward end to a foot board 24 mounted on bars 25 that are pivotally supported at their rear ends on the bar 7. When the frame is collapsed the seat portion will be loose as indicated in Figs. 2 and 3, but when the frame is extended this flexible filling will be drawn taut, as shown in Fig. 1.

Suitable arms 26 are riveted to the bars 8 and are adapted to fold down to a horizontal position with these bars when the frame is collapsed. The handle bars, as indicated in Fig. 3, will when the device is folded, be swung in under the frame between the wheels and where they will not in any way interfere with the compact folding or packing of the cart.

I claim as my invention:—

1. In a collapsible go cart, the combination, with the forward and rear axles and their carrying wheels, of a cart frame supported at its rear end on the rear axle, side bars 8 mounted at their lower ends on the forward axle and pivotally connected with the forward end of said cart frame and extending above the same, bars 9 having a sliding support on said cart frame at their lower ends and pivotally connected with said bars 8 at their upper ends, handle bars also pivotally connected with the upper ends of said bars 8 and 9, links connecting said handle bars with said cart frame and whereby the downward pressure on said handle bars will cause said bars 9 to slide downwardly on said cart frame to a horizontal position, and means for locking said bars 9 in a raised position on said cart frame.

2. In a collapsible go cart, a cart frame 6 having a cross rod 10, bars 9 having notches at their lower ends to receive said cross bar, and guides through which said bar extends, plates pivoted on said bars 9 and also having notches to receive said rod 10 and said plates being adapted when swung down to a horizontal position to raise said bars 9 until the said cross rod enters the said notches in the lower ends of said bars, substantially as described.

3. In a collapsible go cart, the combination with a cart frame, having carrying wheels, of rear bars slidably mounted on said frame and adapted to be raised to an upright position or moved down to a substantially horizontal position, handle bars mounted on said rear bars and having a pivoted link connection with said cart frame and means for locking said rear bars in their raised position.

4. In a collapsible go cart, the combination, with a cart frame having a cross bar 10, of rear bars 9 slidably mounted on said cross bar and having notches at their lower ends to receive said cross bar, plates pivoted on said rear bar and also having notches to receive said cross bar and lock it in the notches in said rear bar, and said plates being adapted to be swung down over said cross bar to a substantially horizontal position to lock said rear bar or be raised to a substantially upright position to release the same.

5. In a collapsible go cart, the combination, with a cart frame having a cross rod, of rear bars slidably mounted on said rod, plates pivoted on said rear bars and having notches to receive said cross bar, said plates being adapted to be swung down over said cross bar to lock said rear bars thereon or be raised to an upright position to release said rear bars and cross bar.

6. In a collapsible go cart, a cart frame having suitable carrying wheels, rear bars 9 slidably mounted on said frame, means for locking said bars 9 in their raised position on said frame, handle bars pivoted on said bars 9 and having ends projecting beyond the same, and links 20 connecting said projecting ends with said cart frame, substantially as described.

7. A collapsible go cart comprising a cart frame having carrying wheels and cross bars 7 and 10, and a pivoted foot board, rear bars 9 slidably mounted on said bar 10 and a flexible filling strip connecting the upper portion of said bars 9 and engaging said bar 10 and rod 7 and attached to said pivoted foot board, substantially as described.

8. A go cart comprising a cart frame having carrying wheels, rear bars slidably mounted on said frame and adapted to be swung down to a horizontal position thereon, handle bars pivoted on said rear bars and having a pivotal link connection with said cart frame and adapted to be swung down under said frame when the cart is collapsed.

9. A go cart comprising forward and rear axles and wheels therefor, a cart frame mounted on said rear axle, forward bars mounted on the forward axle and having a pivotal connection with said cart frame, rear bars having a sliding connection with said cart frame and pivotally connected at their upper ends to said forward bars, means for locking said rear bars in their raised position, and handle bars pivoted on said rear bars and having forwardly projecting ends, and links connecting said ends with said cart frame, substantially as described.

10. A go cart comprising a cart frame having a rear axle and carrying wheels, a collapsible seat frame thereon having a forward axle and carrying wheels, said cart frame and said seat frame being composed of metallic bars pivotally connected with one another, handle bars pivotally mounted on said seat frame and said handle bars being adapted to swing down under said cart frame and under said wheel axles when said frames are collapsed.

11. A go cart comprising a cart frame having carrying wheels and provided with sliding rear bars, and means for locking them in a raised position and handle bars pivotally connected with said sliding bars and adapted to be swung down under the cart frame and between the wheels when it is collapsed.

12. In a collapsible go cart, the combination, with a cart frame, of a folding seat frame mounted thereon, a bail pivoted on one frame and having means to engage the other frame, the point of engagement of said means with said other frame being capable of moving past the center of the bail pivot, thereby taking up lost motion in the joints of the seat frame when unfolded and locking it in its expanded position.

13. A go cart, comprising a cart frame having a rear axle and carrying wheels, a seat frame pivoted on said cart frame and composed of pivotally connected bars, handle bars pivotally mounted on said seat frame, links pivotally connecting said handle bars with said cart frame and said handle bars being capable of folding downwardly under said cart frame and under said axle when said seat frame is collapsed.

14. A go cart comprising a cart frame having carrying wheels and a collapsible seat frame thereon having a sliding connection with said cart frame, and pivoted handle bars having a link connection with said cart frame.

15. A go-cart comprising a cart frame having carrying wheels, a collapsible seat frame mounted thereon having a pivotal connection with said cart frame, handle bars mounted on said seat frame, links pivotally connecting said handle bars with said cart frame, and said handle bars being adapted to swing down under said cart frame when the cart is collapsed.

16. A go cart comprising a cart frame having carrying wheels, a collapsible seat frame thereon having a sliding connection with said cart frame, means for locking the rear portion of said seat frame in its raised or expanded position, and handle bars pivotally connected with said seat frame.

17. A go cart comprising a cart frame having carrying wheels, a seat frame carried by said cart frame and having a sliding connection with said cart frame, means adapted to be operated by the foot of the attendant for locking or unlocking said seat frame, and handle bars pivotally connected with said seat frame.

18. A go cart comprising a cart frame having carrying wheels, a collapsible seat frame mounted on said cart frame and having a sliding connection with said cart frame, a bail adapted to be operated by the foot for locking said seat frame in its expanded position, and handle bars pivotally connected with said seat frame.

19. In a go cart, a cart frame having carrying wheels, a folding seat frame thereon, and a bail adapted to be operated by the foot and arranged to engage said cart frame and lock said seat frame in its expanded position.

20. In a go cart, a cart frame having carrying wheels and a rear cross bar, a folding seat frame mounted on said cross bar, and a locking device arranged to engage said cross bar and lock said seat frame in its expanded position.

21. In a go cart, a cart frame having a rear cross bar, a collapsible seat frame, and a pivoted bail adapted to engage said cross bar and lock said seat frame in its expanded position.

22. A go cart comprising a cart frame and carrying wheels therefor, a seat frame having a rear portion that is slidably supported on said cart frame, and means comprising a pivoted bail for locking said rear portion in its raised position.

23. A go cart comprising a cart frame having carrying wheels and a collapsible seat frame thereon, and a pivoted bail, having means near its pivot for locking said seat frame in its unfolded position, substantially as described.

24. A go cart, comprising a frame having carrying wheels, a folding seat frame mounted on said wheeled frame, handle bars therefor, and a locking device pivoted on one frame and having means to engage the other frame, the point of contact of said means with the other frame moving past the center of said locking device pivot whereby when said seat frame is unfolded, lost motion in the joints will be taken up and said seat frame rigidly held.

In witness whereof, I have hereunto set my hand this 5th day of November 1906.

MARSHALL B. LLOYD.

Witnesses:
A. C. PAUL,
C. G. HANSON.